United States Patent
Naito et al.

(10) Patent No.: US 8,259,422 B2
(45) Date of Patent: Sep. 4, 2012

(54) SWITCHING POWER SUPPLY PROTECTION SYSTEM, MOTHER BOARD AND COMPUTER

(75) Inventors: Michinori Naito, Toyoake (JP); Naoyuki Todoroki, Sagamihara (JP); Kenta Ota, Hadano (JP); Junya Ide, Hadano (JP); Yusuke Morita, Hadano (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 12/615,441

(22) Filed: Nov. 10, 2009

(65) Prior Publication Data
US 2010/0123979 A1    May 20, 2010

(30) Foreign Application Priority Data
Nov. 14, 2008 (JP) .................................. 2008-292123

(51) Int. Cl.
H02H 3/20 (2006.01)
(52) U.S. Cl. ......................................... 361/18; 361/91.1
(58) Field of Classification Search .................... 361/18, 361/91.1, 111
See application file for complete search history.

(56) References Cited

U.S. PATENT DOCUMENTS
2004/0150928 A1* 8/2004 Goodfellow et al. ........... 361/90
2007/0103833 A1* 5/2007 Harris, IV .................... 361/103

FOREIGN PATENT DOCUMENTS
JP  2001-186760   7/2001
JP  2003-319547   11/2003

* cited by examiner

*Primary Examiner* — Danny Nguyen
(74) *Attorney, Agent, or Firm* — Antonelli, Terry, Stout & Kraus, LLP.

(57) ABSTRACT

By using switching power supplies a, b, and n, which have detection function of over-current, over-voltage and low voltage, in the case where a short-circuit occurred in a load which is connected to output of a switching power supply, and in the case where a MOSFET of the switching power supply is in a short-circuit state and broken, a main power is forced to be off, and a failure log of the switching power supply is stored in a non-volatile memory unit EEPROM; and also in the case where the main power was turned off and on, even if an abnormal log of the switching power supply logged in the non-volatile memory unit, reclosing of the main power is suppressed and which of the switching power supply occurred failure is notified to the outside.

15 Claims, 7 Drawing Sheets

SWITCHING POWER SUPPLY PROTECTION SYSTEM, MOTHER BOARD AND COMPUTER

INCORPORATION BY REFERENCE

The present application claims priority from Japanese application JP 2008-292123 filed on Nov. 14, 2008, the content of which is hereby incorporated by reference into this application.

BACKGROUND OF THE INVENTION

The present invention relates to a switching power supply protection system, a mother board and a computer, and in particular, relates to the switching power supply protection system mounted on the mother board, the mother board mounted with the switching power supply, and the computer configured by equipped with the mother board.

In recent years, in connection with the trend toward a lower voltage-type CPU or the like, number of the switching power supplies mounted on the mother board of the computer has been increasing. In addition, in connection with the trend toward the more compact and higher current-type switching power supply, also a MOSFET, which is a switching element to be used in the switching power supply, has been toward a more compact and higher current-type. However, such a more compact and higher current-type MOSFET has a thin gate oxide film, which easily breaks down in a short-circuit mode. Therefore, most causes of smoke and fire accidents of the mother board in recent years are caused by MOSFET short-circuit of the switching power supply.

It should be noted that, as conventional technology to prevent over-current of a feed line in an electronic circuit board of a computer device, and makes possible to prevent smoke and fire of the board, it is known technology described, for example, in JP-A-2003-319547.

SUMMARY OF THE INVENTION

The conventional technology described in JP-A-2003-319547 is one for making possible to prevent smoke and fire of a circuit board, by equipped with an over-current detection circuit, detecting over-current of a feed line in an electronic circuit board (mother board) of a computer device, and stopping power supply from a power unit. However, because this conventional technology does not have protection function by over-voltage detection, in the case of such a fault to be broken in a short-circuit mode of the MOSFET which configures the switching power supply, voltage over the maximum rating for the load is applied, resulting in having a problem that the load may generate a possibility of smoke and fire.

In addition, because the conventional technology does not have a memory unit for memorizing a fault in a non-volatile way, in the case where of an auxiliary power was turned off and on, a latch circuit, which is shutting-down a main power, is released. Therefore, the aforementioned conventional technology makes possible reclosing of the main power without removing the fault causes, and also has a problem that fault of parts progresses resulting in smoke and fire, when reclosing of the main power is repeated.

It is an object of the present invention to solve the aforementioned conventional technological problems, and provide the switching power supply protection system, the mother board and the computer, in which the main power is cut-off, in the case where the load is in a short-circuit state, or in the case where the MOSFET of the switching power supply is broken in a short-circuit mode, and also, smoke and fire of parts is prevented as well as repair of the mother board mounted with the switching power supply is made easy, even in the case where the auxiliary power turned of and on is performed afterwards.

According to one aspect of the present invention, the object is achieved by equipped a switching power supply protection system and mother board with: one or a plurality of switching power supplies, which have detection function of over-current, over-voltage and low voltage, and output an abnormality notification signal for notifying abnormality in detection of over-current, over-voltage and low voltage; a protection unit, which outputs a power supply failure signal corresponding to each of the one or a plurality of switching power supplies, by receiving the abnormality notification signal; a microcomputer, which stores a failure log to a non-volatile memory unit, by receiving the power supply failure signal, and as well as outputs a power source cut-off signal; and a power source cut-off unit, which shuts-down a main power supplied to one or a plurality of switching power supplies, by receiving the power supply failure signal and the power source cut-off signal.

According to another aspect of the present invention, not only in the case where the load, which is connected to the output of the switching power supply, is in a short-circuit state, but also in the case where a fault caused of short-circuit of the MOSFET, which configures the switching power supply, reclosing of the main power can be suppressed, and in this way, smoke and fire of parts can be prevented. In addition, according to the present invention, because it is designed that which of a plurality of the switching power supplies present occurred failure is notified, it is possible to repair easily the mother board in which the failure occurs.

Other objects, features and advantages of the invention will become apparent from the following description of the embodiments of the invention taken in conjunction with the accompanying drawings.

DESCRIPTION OF THE EMBODIMENTS

Explanation will be given below in detail on the switching power supply protection system mounted on the mother board, the mother board mounted with the switching power supply, and the computer configured by equipped with the mother board, according to the present invention, with reference to drawings.

Figure 9:
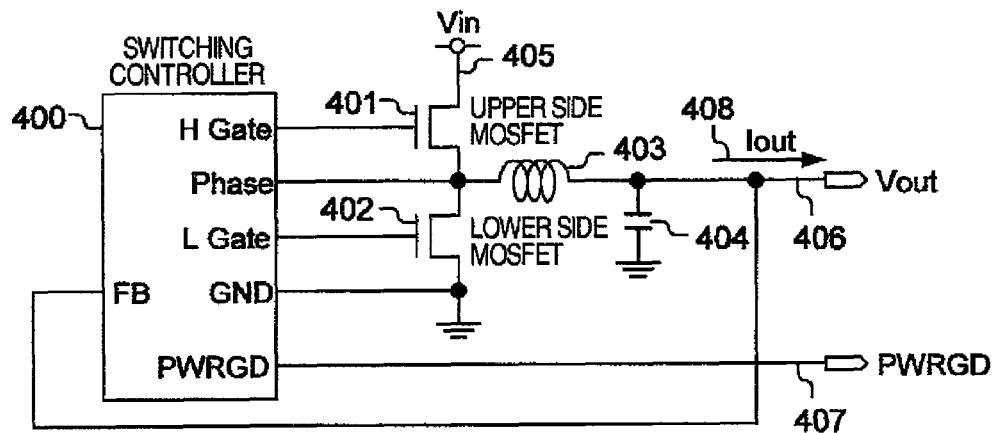
FIG. 9 is a block diagram showing a circuit configuration of the switching power supply having each function of over-current detection, over-voltage detection and low voltage detection, which are premise of the present invention.

FIG. 9 is a block diagram showing a circuit configuration of the switching power supply having each function of over-current detection, over-voltage detection and low voltage detection, which are premise of the present invention, and explanation will be given first on this.

The switching power supply, which is a premise of the present invention, as shown in FIG. 9, is configured by a switching controller 400, an upper side MOSFET 401, a lower side MOSFET 402, a coil 403 and a condenser 404. The upper side MOSFET 401 and the lower side MOSFET 402 are connected in series, and a supply voltage Vin 405, which is supplied from the main power, not shown in FIG. 9, is supplied to the upper side MOSFET 401, and the lower side MOSFET 402 is grounded.

And, the switching controller 400 controls gates of the upper side MOSFET 401 and the lower side MOSFET 402, by output signals from an H gate terminal and a L gate terminal, and controls so as to set the lower side MOSFET 402 to OFF, when the upper side MOSFET 401 is ON, and set the lower side MOSFET 402 to ON, when the upper side MOSFET 401 is OFF. In addition, the switching controller 400 controls ON time width of the upper side MOSFET 401 (OFF time width of the lower side MOSFET 402) in controlling this MOSFET. In addition, the switching controller 400, as will be described later, has function to output a state of a power good signal PWRG 407 as a state showing the occurrence of abnormality, by performing over-current detection, over-voltage detection and low voltage detection and when they were detected.

By the control of the aforementioned switching controller 400, the supply voltage Vin 405 converted into pulses is output to the connection point between the upper side MOSFET 401 and the lower side MOSFET 402. This pulse is smoothened by the coil 403 and the coil 404, and is generated as an output voltage Vout 406 of the switching power supply. This output voltage Vout 406 is supplied to a load, which requires power, as well as returned to a terminal FB of the switching controller 400. In this way the switching controller 400 controls output pulse width of this connection point, by controlling the ON time width of the aforementioned upper side MOSFET 401 (OFF time width of the lower side MOSFET 402), and controls the output voltage Vout 406 so as to become predetermined value.

Figure 10:
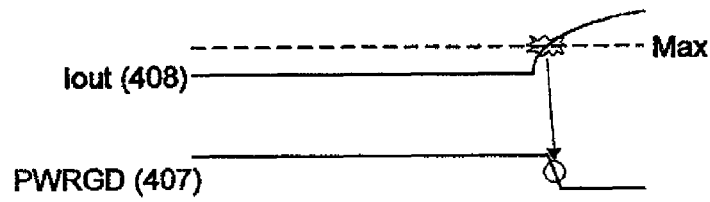
FIG. 10 is a drawing explaining about a detection function of short-circuit of a load side where output voltage Vout is connected in the switching power supply shown in FIG. 9.

FIG. 10 is a drawing explaining about a detection function of short-circuits of a load side where output voltage Vout is connected in the switching power supply shown in FIG. 9, and explanation will be given next on this.

In order to detect short-circuit of a load side, a level of the output current Iout 408 is detected, and when the level thereof is detected to be over the Max value set in advance, it may be judged to be in a short-circuit state. In the embodiment of the present invention, a switching controller 400 performs detection of the level of this output current Iout 408. And, in the case where the level of the output current Iout 408 is over the Max value set in advance, the switching controller 400, as shown in FIG. 10, notifies that abnormality occurred, by setting the power good signal PWRGD 407 from High level to Low level, as over-current was detected caused by occurrence of short-circuit at the load side.

In an example shown in FIG. 9, as a detection method for the output current Iout 408, there are a calculation method from ON state resistance of the upper side MOSFET 401; a calculation method from ON state resistance of the lower side MOSFET 402; and a calculation method from direct current resistance of a coil 403. Explanation will be given here on calculation method from ON state resistance of the lower side MOSFET 402.

The switching controller 400 can calculate voltage applied between a drain and a source of the lower side MOSFET 402, at the timing where the lower side MOSFET 402 is ON, from voltage between a terminal Phase and a terminal GND, and calculate the Iout 408 by dividing voltage between the terminal Phase and the terminal GND with ON resistance of the lower side MOSFET 402. In the case where the Iout 408 determined was over the Max value set in advance, the switching controller may notify abnormality occurred, by setting the power good signal PWRGD 407 from High level to Low level.

Figure 11:
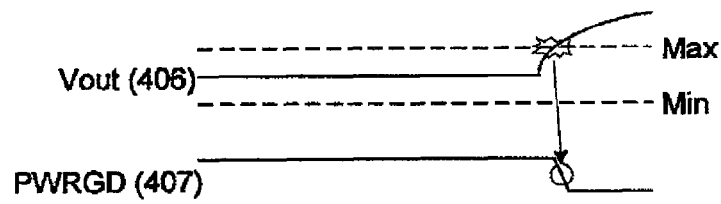
FIG. 11 is a drawing explaining about a detection function of short-circuits of an upper side MOSFET in the switching power supply shown in FIG. 9.
Figure 12:
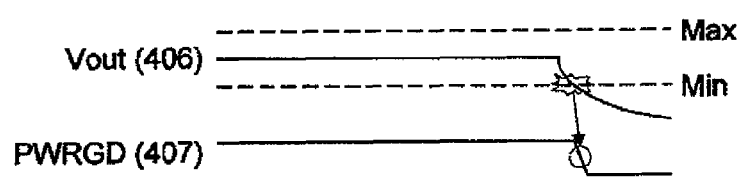
FIG. 12 is a drawing explaining about a detection function of short-circuits of a lower side MOSFET in the switching power supply shown in FIG. 9.

FIG. 11 is a drawing explaining about a detection function of short-circuit of an upper side MOSFET in the switching power supply shown in FIG. 9, and FIG. 12 is a drawing explaining about a detection function of short-circuit of a lower side MOSFET in the switching power supply shown in FIG. 9, and explanation will be given next on these.

The switching controller 400, as shown in FIG. 9, is observing a voltage of the output voltage Vout 406 by inputting to a terminal FB. When the upper side MOSFET 401 is broken in a short-circuit mode, the value of the output voltage Vout 406 results in to increase as shown in FIG. 11. In the case where the output voltage Vout 406 was over the Max value set in advance, the switching controller 400 notifies abnormality occurred by setting the power good signal PWRGD 407 from High level to Low level, as over-voltage at the output voltage Vout 406 was detected.

In addition, when the lower side MOSFET 402 is broken in a short-circuit mode the output voltage Vout 406 decreases as shown in FIG. 12. In the case where the output voltage Vout 406 was below the Max value set in advance, the switching controller 400 notifies abnormality occurred, as abnormal voltage decrease at the output voltage Vout 406 was detected, by setting the power good signal PWRGD 407 from High level to Low level.

As described above, the switching power supply, which is premise of the present invention, has each function of over-current detection, over-voltage detection and low voltage detection, and in this way enables to detect short-circuit of a load side, short-circuit of the upper side MOSFET 401 and short-circuit of the lower side MOSFET 402.

Figure 1:
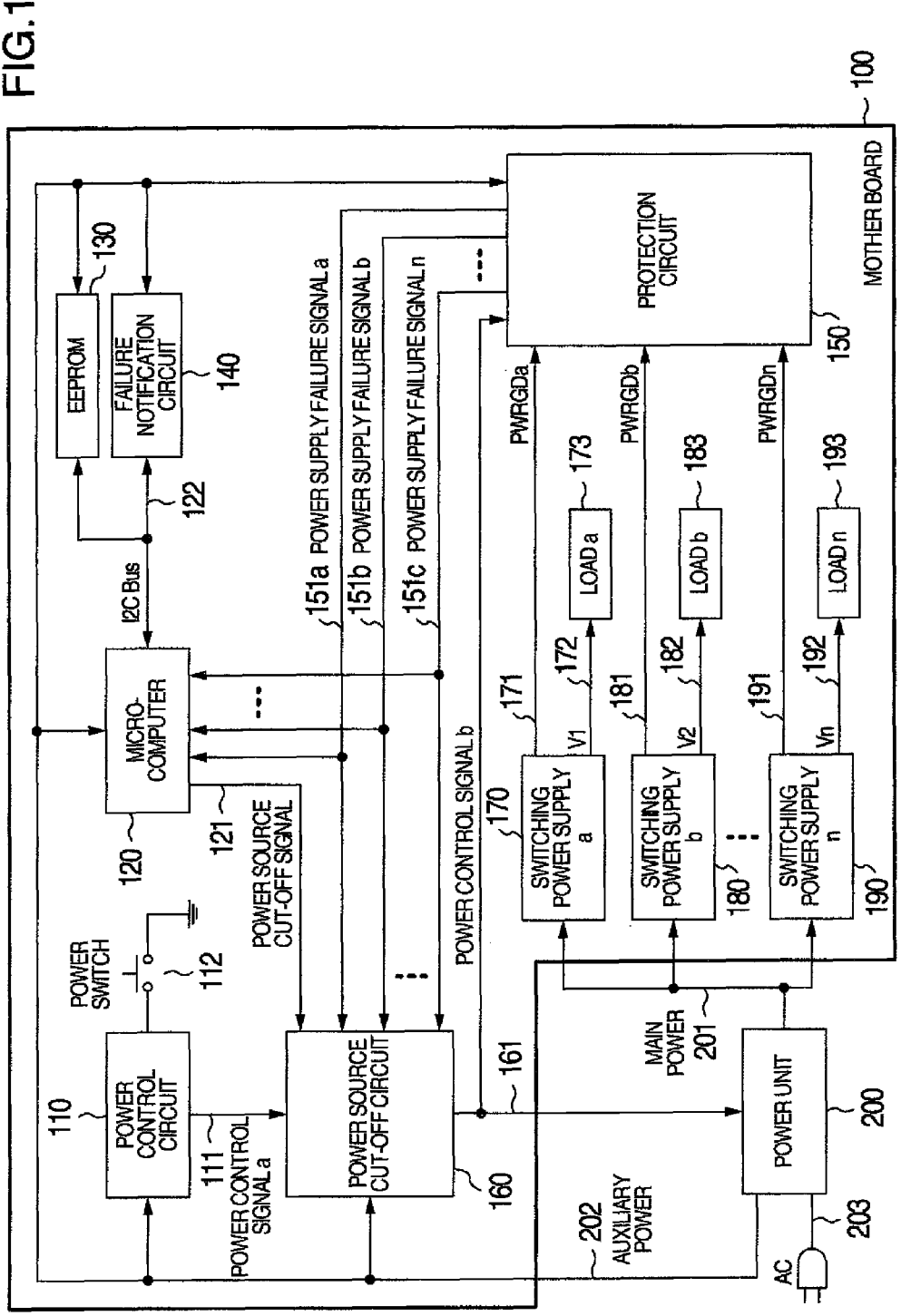
FIG. 1 is a block diagram showing a configuration of a mother board according to one embodiment of the present invention.

FIG. 1 is a block diagram showing a configuration of a mother board according to one embodiment of the present invention. The mother board 100 shown in FIG. 1 is one containing a configuration of the switching power supply protection system according to the present invention, as well as one usable to configure a computer.

A mother board 100 shown in FIG. 1 is configured by being mounted with a plurality of the switching power supplies a 170, b 180, . . . , and n 190, which have function to output the power good signal PWRGDS a 171, b 181, . . . , and n 191 by setting each to Low level, when abnormality was detected by each function of over-current detection, over-voltage detection and low voltage detection, as explained above; the protection circuit 150 which outputs power supply failure signals a 151*a*, b 151*b*, . . . , and n 151*c*, by receiving notification of abnormality occurrence by Low level of the power good signal PWRGDs a171, b181, . . . , and n191; the failure notification circuit 140 which notifies occurrence of failure to the outside; the EEPROM 130 which is a non-volatile memory unit and stores a power supply failure log; the microcomputer 120 which controls power circuits on the mother board 100, by receiving the power supply failure signals a 151*a*, b 151*b*, . . . , and n 151*c* from the protection circuit 150; the power control circuit 110 where the power switch 112 is connected; the power source cut-off circuit 160 which controls the power unit 200 supplying to the switching power supply, by receiving the power supply failure signals a 151*a*, b 151*b*, . . . , and n 151*c* from the protection circuit 150, a power source cut-off signal 121 from the microcomputer 120, and a power control signal a 111 from the power control circuit 110; and the loads a 173, b 183, . . . , and n 193 which operate by supply of voltage V1, V2, . . . , and Vn, from each of the aforementioned switching power supplies a 170, b 180, . . . , and 190.

At the outside of the aforementioned mother board 100, there is equipped the power unit 200 which is configured by the main power 201 for supplying power to the aforementioned switching power supply on the mother board 100, connected to a commercial power 203; and the auxiliary power 202 for supplying a power to the aforementioned protection circuit 150, the failure notification circuit 140, the EEPROM 130, the microcomputer 120, the power control circuit 110 and the power source cut-off circuit 160.

Figure 3:
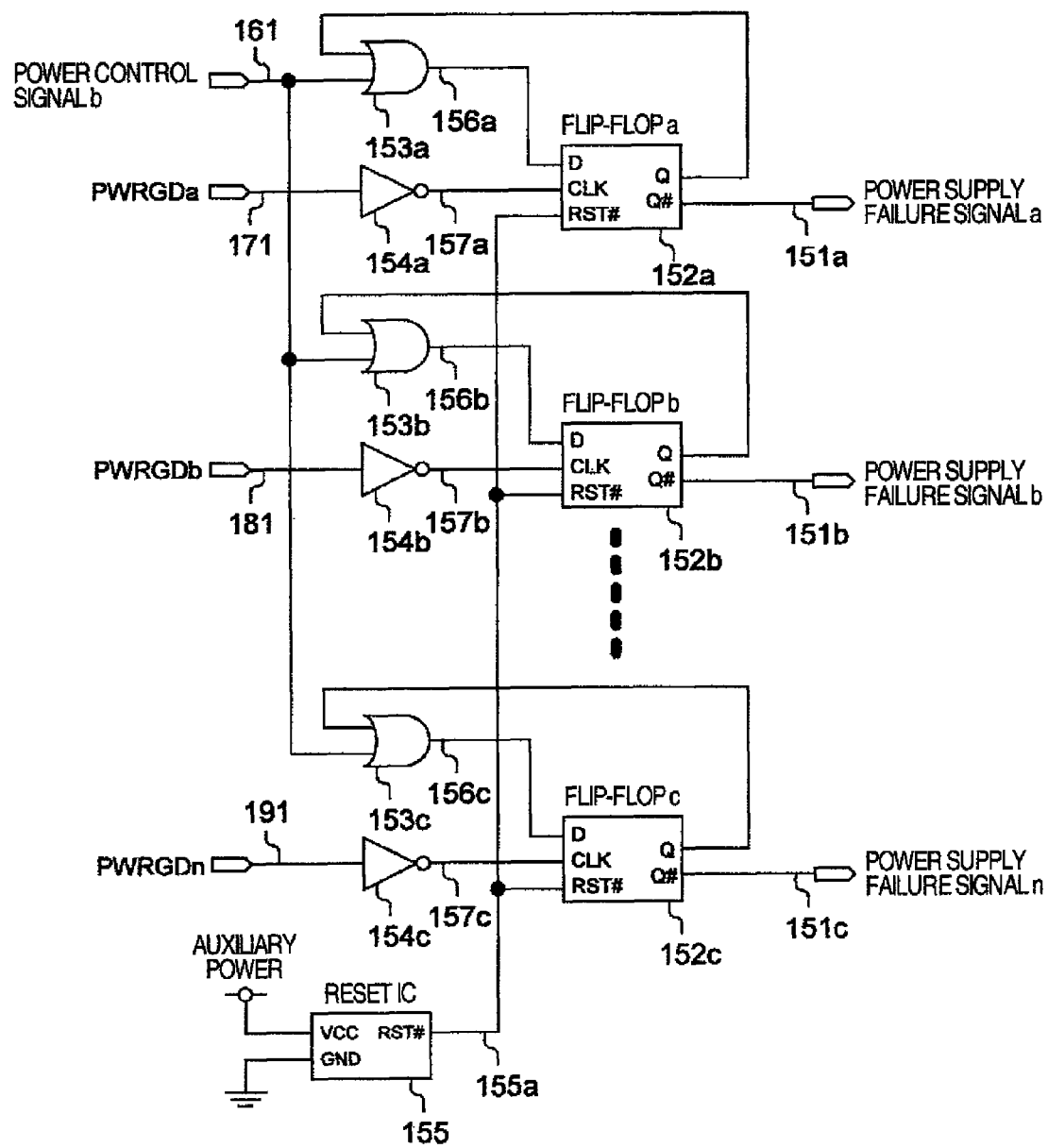
FIG. 3 is a block diagram showing a circuit configuration example of a protection circuit.

FIG. 3 is a block diagram showing a circuit configuration example of a protection circuit 150. The protection circuit 150 has function to observe the power good signals PWRGDs a 171, b 181, . . . , and n 191, which are output by each switching power supply, and a power control signal b 161 from the power source cut-off circuit 160. The protection circuit 150 notifies to the power source cut-off circuit 160 and the microcomputer 120 corresponding to the power supply failure signals a 151*a*, b 151*b*, . . . , and n 151*c*, as a state showing a power supply failure, in the case where even at least one of the power good signals PWRGDs a 171, b 181, . . . , and n 191, which are output by each switching power supply, became Low level showing the occurrence of abnormality.

And, the protection circuit 150 is configured by flip-flops a 152*a*, b 152*b*, . . . , and n 152*c* corresponding to the power good signals PWRGDS a 171, b 181, . . . , and n 191, which are output by each switching power supply; inverter gates 154*a*, 154*b*, . . . , 154*c*, which are input the signals PWRGDS a 171, b 181, . . . , and n 191; OR-gates 153*a*, 153*b*, . . . , and 153*c*, which are input the power control signal b 161; and a reset IC 151 which controls the flip-flops by supply a auxiliary power from the power unit 200, as shown in FIG. 3, to realize the aforementioned function.

Figure 4:
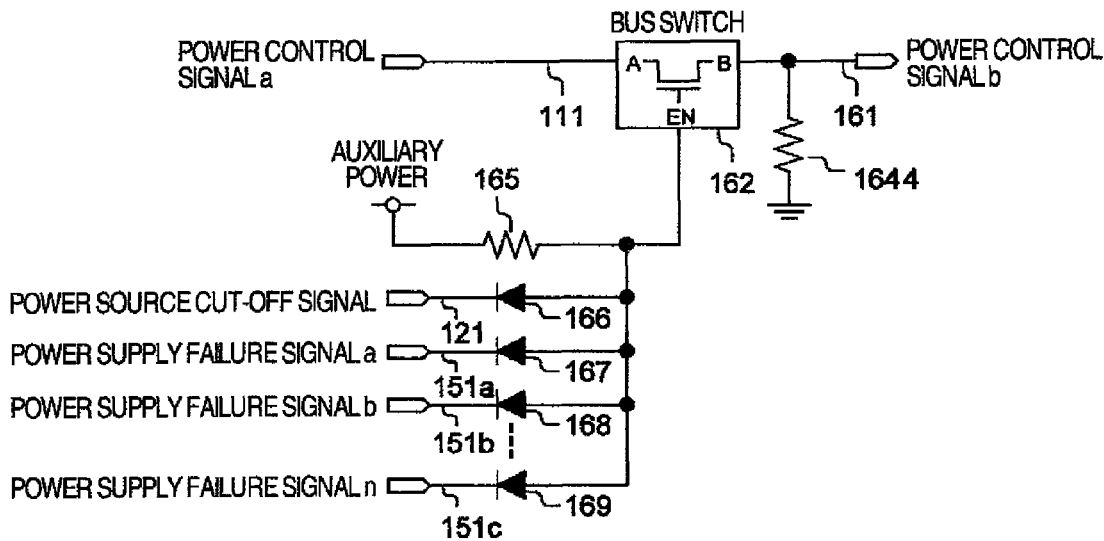
FIG. 4 is a block diagram showing a circuit configuration example of a power source cut-off circuit.

FIG. 4 is a block diagram showing a circuit configuration example of a power source cut-off circuit. The power source cut-off circuit 160 has function to control whether the power control signal a 111 from the power control circuit 110 should be output or not, as the power control signal b 161, by inputs the power supply failure signals a 151*a*, b 151*b*, . . . , and n 151*c* from the protection circuit 150, and the power source cut-off signal 121 from the microcomputer 120. And, the power source cut-off circuit 160 is configured by diodes 166 to 169, a bus switch 162, a pull down resistance 164 and a pull up resistance 165, as shown in FIG. 4, to achieve the function.

Figure 5:
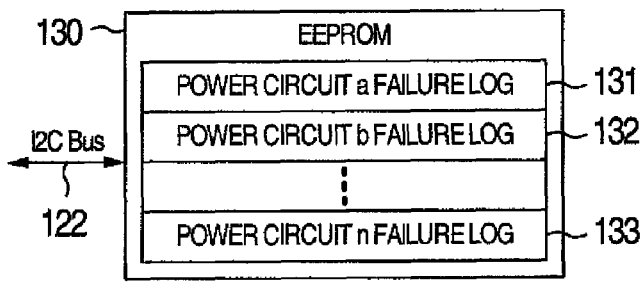
FIG. 5 is a block diagram showing a configuration example of an EEPROM.

FIG. 5 is a block diagram showing a configuration example of an EEPROM. At the inside of the EEPROM 130, there is stored a power circuit "a" failure log 131, a power circuit "b" failure log 132, . . . , and a power circuit "n" failure log 133, which are failure logs of each of the switching power supplies, in a state that reading and writing from the microcomputer 120 are possible via the I2C Bus 122, as shown in FIG. 5.

Figure 6:
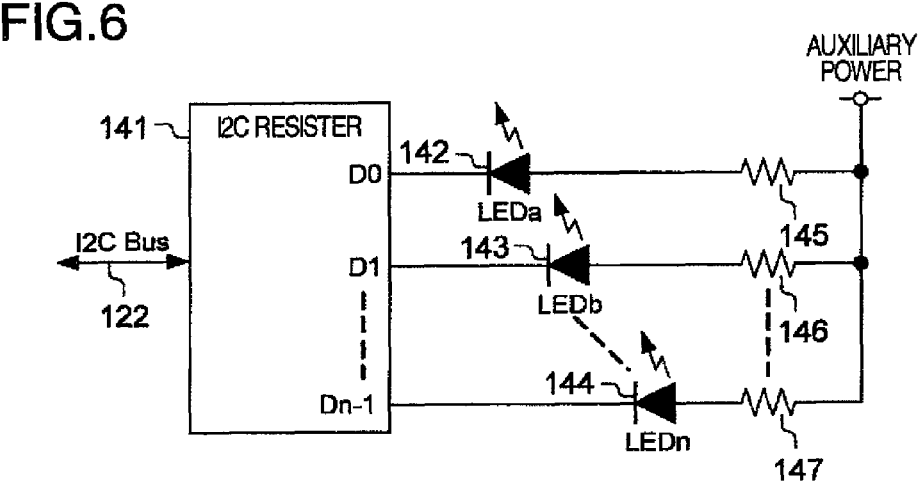
FIG. 6 is a block diagram showing a configuration example of a circuit which out puts the power supply failure signal.

FIG. 6 is a block diagram showing a circuit configuration example of failure notification circuit 140. The failure notification circuit 140 is configured by an I2C resister 141, which memorizes failure information of the switching power supply input from the microcomputer 120 via the I2C Bus 122; an LED a 142, an LED b 143, . . . , and an LED n 144 corresponding to each of the switching power supplies; and pull up resistances 145 to 147 of each LED, as shown in FIG. 6. And, the failure notification circuit 140 has function to light the LED corresponding to the switching power supply in which failures occur, based on failure information of the switching power supply input from the microcomputer 120.

Figure 7:
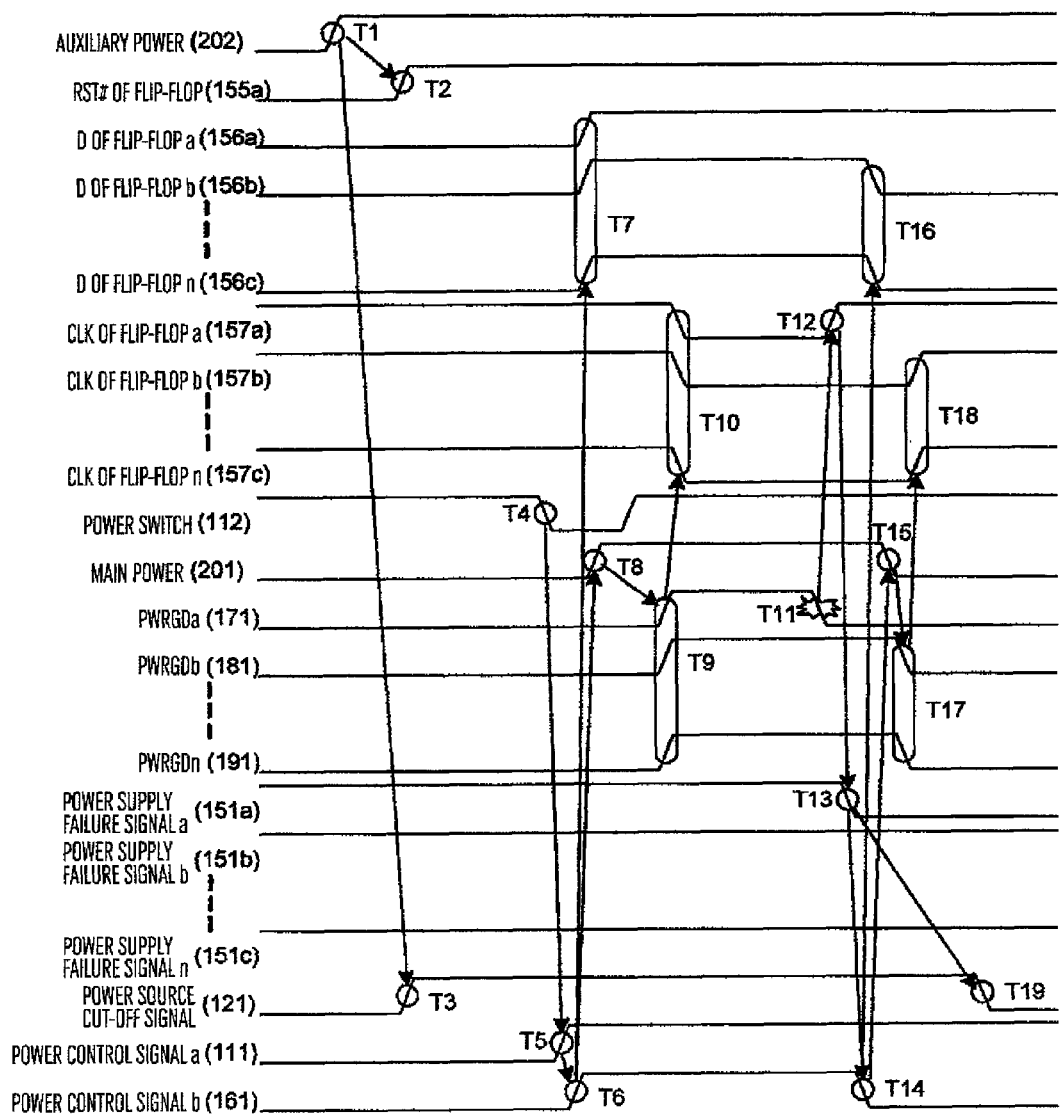
FIG. 7 is a timing chart explaining an operation in an embodiment of the present invention, in the case where one of the switching power supplies on a mother board shown in FIG. 1 becomes abnormal.

FIG. 7 is a timing chart explaining an operation in an embodiment of the present invention, in the case where one of the switching power supplies on a mother board shown in FIG. 1 becomes abnormal, and explanation will be given next on this. It should be noted that this is an example in the case where a switching power supply a 170 in which failures occur.

(1) First, when AC 203, which is a commercial power, is supplied to the power unit 200, the power unit 200 outputs the auxiliary power 202 at the timing of T1. The power control circuit 110, the microcomputer 120, the failure notification circuit 140, the EEPROM 130, the protection circuit 150 and the power source cut-off circuit 160 on the mother board 100 are driven by the auxiliary power 202.

(2) When the auxiliary power 202 is output at the timing of T1, the reset IC 155 of the protection circuit 150 shown in FIG. 3 outputs a signal 155*a* from the terminal RST# at the timing of T2, and releases RST# of all the flip-flops a 152*a*, b 152*b*, . . . , n 152*c*.

(3) In addition, when the auxiliary power 202 is output at the timing of T1, the microcomputer 120 judges the power supply failure by checking the power supply failure log stored in the EEPROM 130, according to the flow shown in FIG. 2 to be described later. In this case, because there is no power supply failure log, the microcomputer 120 releases the power source cut-off signal 121, by starting-up the power source cut-off signal 121 to High level at the timing of T3.

(4) After that, when the power switch 112 is pushed at the timing of T4, the power control circuit 110 outputs the power control signal a 111 at the timing of T5. In this timing of T5, because the power supply failure signals a 151*a*, b 151*b*, . . . , and n 151*c* are at High level, a bus switch 162 of the power source cut-off circuit 160, shown in FIG. 4, becomes ON, and the power control signal b 161 is output at the timing of T6.

(5) When the power control signal b 161 is output at the timing of T6, signals 156*a*, 156*b*, . . . , and 156*c*, which are High level, are applied to a terminal D of all of the flip-flops a 152*a*, b 152*b*, . . . , and n 152*c* of the protection circuit 150, at the timing of T7, and in addition, the power unit 200 outputs the main power 201 at the timing of T8.

(6) The switching power supplies a 170, b 180, . . . , and n 190 output voltage V1 172, V2 182, . . . , and Vn 192, respectively, when the main power 201 is applied to these circuits. When output-voltage V1 172, V2 182, . . . , and Vn 192 from the switching power supplies a 170, b 180, . . . , and n 190, reach specified value, the power good signals PWRGDs a 171, b 181, ..., and n 191 become High level at the timing of T9.

(7) When the signals PWRGDs a171, b181, ..., and n191 become High level at the timing of T9, the signals 157*a*, 157*b*, ..., 157*c*, which became Low level at the timing of T10, are applied to the terminal CLK of all the flip-flops a 152*a*, b 152*b*, ..., n 152*c* of the protection circuit 150. After this state is achieved, the loads a 173, b 183, ..., and n 193 on the mother board 100 start operation, by supplied power from the switching power supplies a 170, b 180, ..., and n 190.

(8) In addition, if short-circuit of a load a 173 of a switching power supply a 170 occurred, or short-circuit of the upper side MOFSET or the lower side MOFSET of the switching power supply a 170 occurred at the timing of T11, the signal PWRGD a 171 of the switching power supply a 170 becomes Low level. When the signal PWRGD a 171 becomes Low level at the timing of T11, a signal 157*a* to the terminal CLK of the flip-flop a 152*a* of the protection circuit 150 shown in FIG. 3 becomes High level at the timing of T12.

(9) When the signal 157*a* to the terminal CLK of the flip-flop a 152*a* becomes High level at the timing of T12, the flip-flop a 152*a* set the power supply failure signal a 151*a* to Low level at the timing of T13. When the power supply failure signal a 151*a* becomes Low level at the timing of T13, the power source cut-off circuit 160 shown in FIG. 4 sets the power control signal b 161 to Low level at the timing of T14.

(10) When the power supply failure signal a 151*a* becomes Low level at the timing of T13, the microcomputer 120 writes a log of failure occurrence at the switching power supply a 170 to the power supply "a" failure log 131 of the EEPROM 130, according to the flow of FIG. 2 to be described later. After the log writing, the microcomputer 120 outputs direction of power source cut-off, by setting the power source cut-off signal 121 to Low level at the timing of T19. In addition, the microcomputer 120 writes a data to the I2C resister 141 of the failure notification circuit 140 shown in FIG. 6, by using an I2C Bus 122 at the timing of T19, and lights LED a 142 showing a failure of the switching power supply a 170. An operator can know that failure occurred at the switching power supply a 170, by confirming the lighting of the LED a 142.

(11) When the power control signal b 161 becomes Low level at the timing of T14, the power unit 200 stops output of the main power 201 at the timing of T15. After that, because the power supply failure signal a 151*a* is kept in an output state, the main power 201 cannot be turned off and on even if the power switch 112 is pushed afterwards. When the power control signal b 161 becomes Low level at the timing of T14, signals 156*b*, ..., and 156*c*, which are applied to the terminal D of the flip-flops b 152*b*, ..., and n 152*c* of the protection circuit 150 at the timing of T16, becomes Low level.

(12) When output from the main power 201 is stopped at the timing of T15, the switching power supplies b 180, ..., n 190 also stop, therefore the PWRGDs b 181, ..., and n 191 also become Low level at the timing of T17. When the PWRGDs, b 181, ..., and n 191 become Low level at the timing of T17, signals 157*b*, ..., and 157*c* applied to the terminal CLK of the flip-flops b 152*b*, ..., and n 152*c* of the protection circuit 150 become High level at the timing of T18. However, because signals 156*b*, ..., and 156*c*, applied to the terminal D of the flip-flops b 152*b*, ..., and n 152*c* is already Low level at the timing of T16, there is no output of the power supply failure signals b 151*b*, ..., and n 151*c*.

By an operation as described above, in the case where short-circuit of a load a 173 of a switching power supply a 170, or short-circuit of the upper side MOFSET or the lower side MOFSET of the switching power supply a 170 occur, the main power 201 can be cut-off, and the switching power supply, which occurred failure, can be notified to an operator. Similarly, also in the case where failure of short-circuit of the load or short-circuit of the MOFSET occur at the switching power supply b 180 or the switching power supply n 190, the main power 201 can be cut-off, and smoke and fire caused by short-circuit of the load or short-circuit of the MOFSET can be prevented, and the switching power supply, which occurred failure, can be notified to an operator.

It should be noted that, in the case where failure of the switching power supply is notified to an operator as the above described, and after the switching power supply repair or exchange, or a load connected to the switching power supply repair or exchange, a worker such as an operator erases a corresponding log inside the EEPROM 130, by operation not shown.

Figure 8:
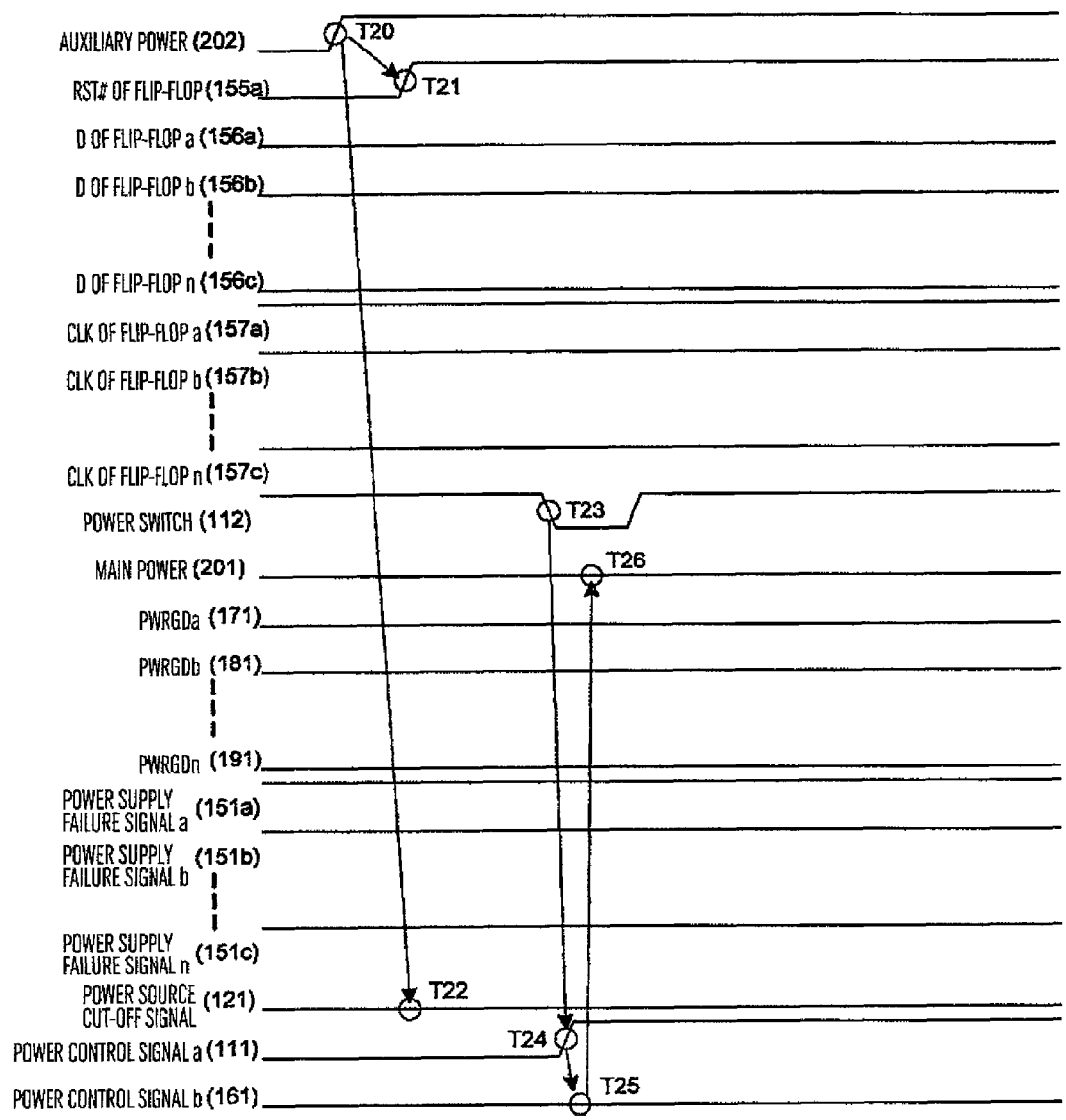
FIG. 8 is a timing chart explaining a suppression processing of reclosing of a main power, after a failure occurred in one of the switching power supplies.

FIG. 8 is a timing chart explaining a suppression processing of reclosing of a main power, after a fault occurred in one of the switching power supplies, and explanation will be given next on this paragraph. An example to be explained here is the case where the commercial power 203 was turned off and on, after the switching power supply a 170 on the mother board was occurred failures in and processed as explained by FIG. 7.

(1) When the commercial power 203 is turned off and on, the power unit 200 outputs the auxiliary power 202 at the timing of T20. When the auxiliary power 202 is output at the timing of T20, the reset IC 155 of the protection circuit 150 shown in FIG. 3 outputs the signal 155*a* from the terminal RST# at the timing of T21, and releases the RST# of all the flip-flops a 152*a*, b 152*b*, ..., and n 152*c*.

(2) In addition, when the auxiliary power 202 is output at the timing of T20, the microcomputer 120 checks a power supply failure log stored in the EEPROM 130 and judges the power supply failure log, according to the flow shown in FIG. 2 to be described later. In this case, because the failure log of the switching power supply a 170 remains in the power supply "a" failure log 131, the microcomputer 120 processes the failure notification to an operator without performing release of the power source cut-off signal 121. It should be noted that this process of notification will be described later.

(3) Because the microcomputer 120 does not release the power supply failure signal 121, even when the auxiliary power 202 is supplied, the power source cut-off signal 121 at the timing of T22 still remains at Low level to indicate power source cut-off. And, when the power switch 112 is pushed at the timing of T23, the power control circuit 110 outputs the power control signal a 111 at the timing of T24 to the power source cut-off circuit 160. However, because the power source cut-off signal 121 from the microcomputer 120 remains at Low level, the bus switch 162 inside the power source cut-off circuit 160 remains OFF state and the power control signal b 161 remains at Low level at the timing of T25.

(4) In the case where the power control signal b 161 is Low level at the timing of T25, the power unit 200 is kept not to output the main power 201, therefore, the main power 201 is kept not to be output at the timing of T26.

By an operation as described above, the embodiment of the present invention can suppress reclosing of the main power 201 by the power switch 112, prevent smoke and fire caused by short-circuit of the load of the switching power supply or short-circuit of the MOFSET and notify which of the switching power supply occurred failure to an operator, even if the commercial power 203 is turned off and on and the auxiliary power 202 is supplied.

Figure 2:
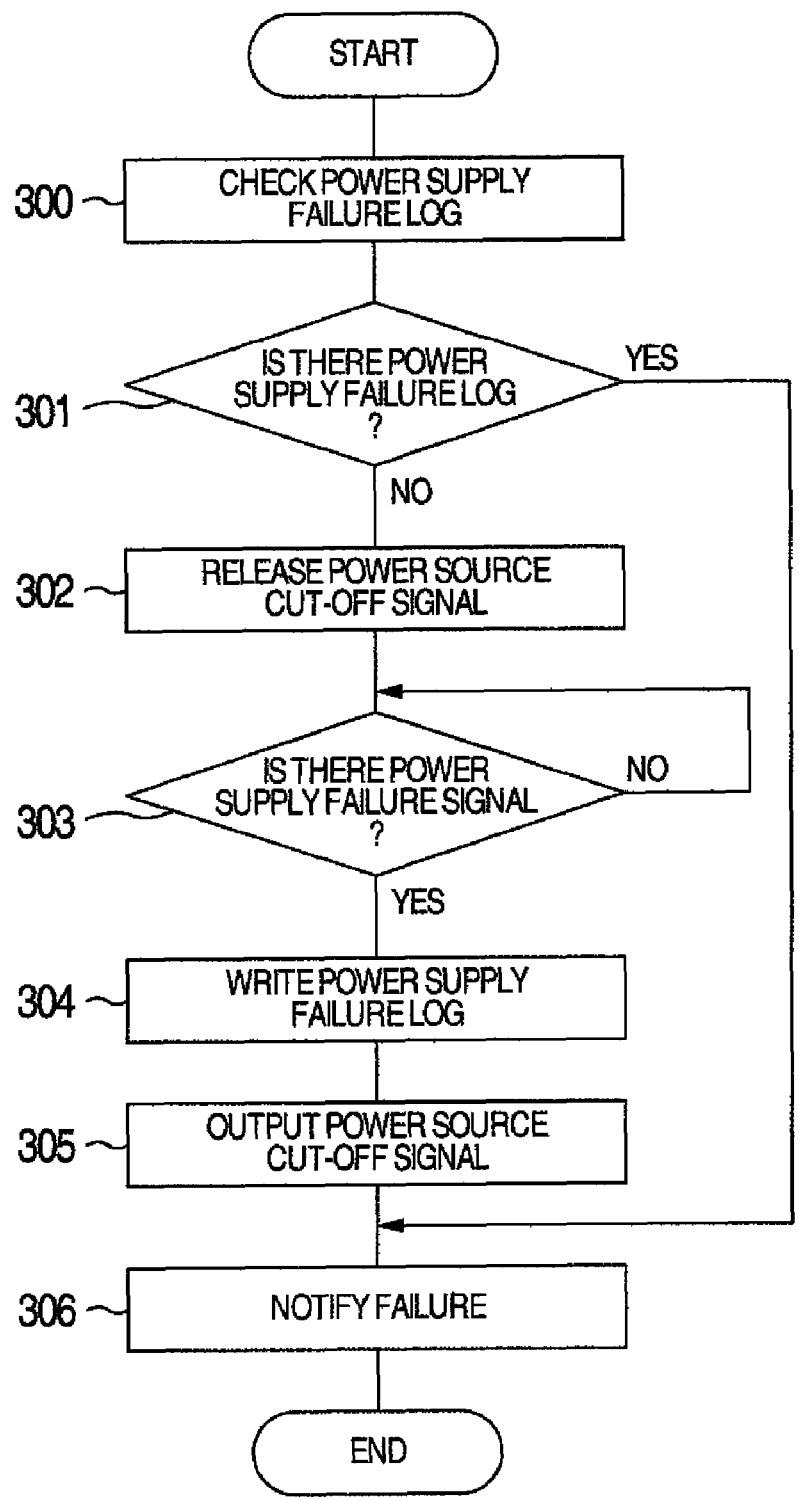
FIG. 2 is a flow chart explaining a processing operation of a microcomputer after an auxiliary power was output.

FIG. 2 is a flow chart explaining a process of a microcomputer 120 after the auxiliary power is supplied, and explanation will be given next on this paragraph.

(1) When the auxiliary power is supplied to a microcomputer 120 and make this microcomputer 120 to an operable state (at the timing of T1 in FIG. 7), the microcomputer 120 first checks a power supply failure log stored in the EEPROM 130 and judges whether the power supply failure logs were logged or not (steps 300 and 301).

(2) In the case where the power supply failure logs were logged by judgment of the step 301, the microcomputer 120 outputs the power source cut-off signal 121 to High level (at the timing of T3 in FIG. 7) and releases the power source cut-off signal 121 (step 302).

(3) By release of the power source cut-off signal 121 at the step 302, a switching power supply on the mother board 100 supplies power to a load by application of the main power 201, as explained with the timing chart of FIG. 7. A device such as a computer mounted the mother board 100 becomes an operation state and the microcomputer 120 continues monitoring the power supply failure signals a 151a, b 151b, ..., and n 151c from the protection circuit 150. And the microcomputer 120 judges whether there is at least one of these signals indicating the occurrence of a power supply failure or not, by monitoring the power supply failure signals a 151a, b 151b, ..., and n 151c from the protection circuit 150 (step 303).

(4) In the case where at least one of the power supply failure signals indicate the occurrence of a power supply failure by judgment of the step 303 (at the timing of T13 in FIG. 7), the microcomputer 120 logs a power supply failure log to the EEPROM 130 via the I2C Bus 122 as well as sets the power source cut-off signal 121 to Low level (at the timing of T19 in FIG. 7) and outputs direction of power source cut-off (steps 304 and 305).

(5) After process of the step 305 or in the case where the power supply failure logs were logged in the EEPROM 130 by judgment at the step 301, a data is written in the I2C resister 141 of the failure notification circuit 140 via I2C Bus 122, and an LED a 142 is lit to indicate occurrence failures in the switching power supply "a" 170. An operator and so on can be notified that the failures occurred in the switching power supply "a" 170, by confirming the lighting of the LED "a" 142 (step 306).

The present invention can be utilized not only to the mother boards of computer systems but also various electric devices using the switching power supplies.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A switching power supply protection system, comprising:
one or a plurality of switching power supplies, which have detection function of over-current, over-voltage and low voltage, and output an abnormality notification signal for notifying abnormality in detection of over-current, over-voltage and low voltage;
a protection unit, which outputs a power supply failure signal corresponding to each of said one or a plurality of switching power supplies, by input of said abnormality notification signal;
a microcomputer, which stores a failure log to a non-volatile memory unit, by input of said power supply failure signal, and as well as outputs a power source cut-off signal; and
a power source cut-off unit, which cuts-off a main power supplied to said one or a plurality of switching power supplies, by inputs of said power supply failure signal and the power source cut-off signal.

2. The switching power supply protection system according to claim 1, wherein said switching power supply outputs the abnormality notification signal by over-current, in the case where a short-circuit occurs in a load; by over-voltage, in the case of damage caused by short-circuit state of an upper side MOSFET which configures the switching power supply; and by low voltage, in the case of damage caused by short-circuit state of a lower side MOSFET which configures the switching power supply.

3. The switching power supply protection system according to claim 1, wherein said protection unit, microcomputer, memory unit and power source cut-off unit operate by supply of a auxiliary power different from said main power.

4. The switching power supply protection system according to claim 1, wherein said microcomputer checks whether a failure of the switching power supply logged inside said memory unit or not when a power unit for supplying said main power was turned off and on, and suppresses supply of the main power in the case where the failure log was logged.

5. The switching power supply protection system according to claim 1, wherein said microcomputer outputs information of the switching power supply where failure occurred, via a failure notification unit, by input of said power supply failure signal.

6. A mother board, comprising:
one or a plurality of switching power supplies, which have detection function of over-current, over-voltage and low voltage, and output an abnormality notification signal for notifying abnormality in detection of over-current, over-voltage and low voltage;
a load which operates by supplied the power from said switching power supply;
a protection unit, which outputs a power supply failure signal corresponding to each of said one or a plurality of switching power supplies, by input of said abnormality notification signal;
a microcomputer, which stores a failure log to a non-volatile memory unit, by input of said power supply failure signal, and as well as outputs a power source cut-off signal; and
a power source cut-off unit, which shuts-down a main power supplied to said one or a plurality of switching power supplies, by input of said power supply failure signal and the power source cut-off signal.

7. The mother board according to claim 6, wherein said switching power supply outputs the abnormality notification signal by over-current, in the case where a short-circuit occurs in a load; by over-voltage, in the case of damage caused by short-circuit of an upper side MOSFET which configures the switching power supply; and by low voltage, in the case of damage caused by short-circuit of a lower side MOSFET which configures the switching power supply.

8. The mother board according to claim 6, wherein said protection unit, microcomputer, memory unit and power source cut-off unit operate by supply of an auxiliary power, different from said main power.

9. The mother board according to claim 6, wherein said microcomputer checks whether a failure of the switching power supply logged inside said memory unit or not when a power unit for supplying said main power was turned off and on, and suppresses supply of the main power in the case where the failure log was logged.

10. The mother board according to claim 6, wherein said microcomputer outputs information of the switching power supply where failure occurred, via a failure notification unit, by input of said power supply failure signal.

11. A computer system including the mother board according to claim 6.

12. A computer system including the mother board according to claim 7.

13. A computer system including the mother board according to claim 8.

14. A computer system including the mother board according to claim 9.

15. A computer system including the mother board according to claim 10.

* * * * *